US008559398B2

(12) United States Patent
Lindoff et al.

(10) Patent No.: US 8,559,398 B2
(45) Date of Patent: Oct. 15, 2013

(54) CHANNEL ESTIMATION USING PRECODED REFERENCE SYMBOLS

(75) Inventors: Bengt Lindoff, Bjärred (SE); Bo Lincoln, Lund (SE); Tobias Rydén, Lund (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 209 days.

(21) Appl. No.: 12/865,095

(22) PCT Filed: Jan. 28, 2009

(86) PCT No.: PCT/EP2009/050947
§ 371 (c)(1),
(2), (4) Date: Sep. 1, 2010

(87) PCT Pub. No.: WO2009/095410
PCT Pub. Date: Aug. 6, 2009

(65) Prior Publication Data
US 2010/0329217 A1   Dec. 30, 2010

Related U.S. Application Data

(60) Provisional application No. 61/024,416, filed on Jan. 29, 2008, provisional application No. 61/052,041, filed on May 9, 2008.

(30) Foreign Application Priority Data

May 5, 2008  (EP) .................................... 08155659

(51) Int. Cl.
H04L 27/06 (2006.01)
H04W 4/00 (2009.01)
H04B 7/208 (2006.01)
(52) U.S. Cl.
USPC ........... 370/332; 370/204; 370/278; 370/329; 370/344; 370/350; 455/114.2

(58) Field of Classification Search
USPC ......... 370/203, 208, 278, 294, 332, 334, 400, 370/331; 375/260, 267, 324, 340, 350, 354; 455/114.2
See application file for complete search history.

(56) References Cited

U.S. PATENT DOCUMENTS

| | | | | |
|---|---|---|---|---|
| 6,381,290 | B1 * | 4/2002 | Mostafa et al. | 375/350 |
| 2002/0191703 | A1 * | 12/2002 | Ling et al. | 375/267 |
| 2004/0085892 | A1 | 5/2004 | Walton et al. | |
| 2007/0064586 | A1 * | 3/2007 | Ma et al. | 370/203 |
| 2008/0014876 | A1 * | 1/2008 | Heikkila et al. | 455/114.2 |
| 2008/0212702 | A1 | 9/2008 | Pan et al. | |

(Continued)

FOREIGN PATENT DOCUMENTS

| | | | |
|---|---|---|---|
| WO | WO 2006/107700 A | 10/2006 | |
| WO | WO 2007/106980 A | 9/2007 | |
| WO | WO 2007106980 A1 * | 9/2007 | |

OTHER PUBLICATIONS

"3GPP Technical Report 25.814 V2.0.0 (Jun. 2006): Physical Layer Aspects for Evolved UTRA".*

(Continued)

Primary Examiner — Wing F Chan
Assistant Examiner — Raji Krishnan

(57) ABSTRACT

A method and system for a cellular telecommunication system is provided. A transmission signal, which includes reference symbols and synchronization symbols, is received from the network node of at least one cell. At least one pre-coding vector is determined for the transmission signal, where one pre-coding vector is associated with transmission by at least one transmit antenna of the network node of the at least one cell. For each of the at least one pre-coding vectors, a channel estimate is estimated for all sub-carriers of the received transmission signal from the received reference symbols and a reference symbol channel model defined for reference symbols of the transmission signal and from the synchronization symbols, the at least one pre-coding vector, and a synchronization symbol channel model defined for synchronization symbols of the transmission signal.

16 Claims, 3 Drawing Sheets

(56) References Cited

U.S. PATENT DOCUMENTS

2008/0232484 A1 9/2008 Budianu et al.

OTHER PUBLICATIONS

Motorola:"Proposal for Dedicated Pilots in Downlink Precoding for EUTRA MIMO" 3rd Generation Partnership Project (3GPP): Technical Specification Group (TSG) Radio Access Network (RAN); Workinggroup 1 (WGI), Meeting #48, 3 GPP TSG RAN WGI Meeting #48, [Online] vol. RI-070770, No. 48, Feb. 12, 2007, pp. 1-5, XP002494688, URL:http://www.3gpp.org/ftp/tsg_ran/WG1_RLI/TSGRI_48/Docs/RI-070770.Zip>.

* cited by examiner

CHANNEL ESTIMATION USING PRECODED REFERENCE SYMBOLS

This application claims the benefit of U.S. Provisional Application No. 61/024,416, filed Jan. 29, 2008, and U.S. Provisional Application No. 61/052,041, filed May 9, 2008, the disclosures of which are fully incorporated herein by reference.

TECHNICAL FIELD

The present invention relates to a method for estimating a channel, and a decoder for performing it, a terminal including such a decoder, and a computer program for implementing the method.

BACKGROUND

In the forthcoming evolution of mobile cellular standards like GSM and WCDMA, new transmission techniques like OFDM will be used. Furthermore, in order to have a smooth migration from existing cellular systems to high capacity high data rate systems in existing radio spectrum, new systems must be able to operate in a flexible bandwidth. A proposal for such a new flexible cellular system is 3G Long Term Evolution (3G LTE) that can be seen as an evolution of the 3G WCDMA standard. This system will use OFDM as multiple access technique (called OFDMA) in the downlink and will be able to operate on bandwidths ranging from 1.25 MHz to 20 MHz. Another important aspect of LTE is the mobility function, hence synchronization symbols and cell search procedures are of major importance in order for a terminal operating in the system to detect and synchronize with other cells.

For mobility reasons the terminal needs to read broadcast information from neighbouring cells prior to handover, in order to collect necessary information as to be able to connect to that other cell. The problem is that the neighbouring cell typically is weaker than the serving cell and hence the detection of broadcast information needs to be done at signal-to-interference ratios (SIRs) below 0 dB. Furthermore, in LTE, reference symbols (RS) are sparse, which makes channel estimation, especially at low SIR, a non-trivial task. This in turn causes the detection of broadcast system information, e.g. the primary broadcast channel (P-BCH) to have quite low performance.

Therefore there is a need for method and apparatus for improving the channel estimates in systems like the LTE, e.g. to enable acquisition of system information from neighbouring cells, or to improve reception of any information from any cell.

SUMMARY

An objective of the invention is to overcome or at least reduce the stated problems. The present invention is based on the understanding that utilising that pre-coding used for transmitting the synchronization signals can be known to the terminal at the time of doing detection of broadcasted system information, and they can hence be used as additional reference symbols in the channel estimation process. The inventors have found that once the terminal knows the pre-coding used for the synchronisation signal transmission, the information of these can be used for extending the channel model and hence also the use of synchronisation symbols in the channel estimation process. Using this, improved channel estimates can be obtained to significantly improve the detector performance, especially when detecting the broadcasted system information during the initial cell search procedure in systems like LTE.

According to a first aspect of the invention, there is provided a method for a terminal of a cellular telecommunication system, the telecommunication system enabling determination of the system information by the terminal from system information from at least one cell operated by a network node of the telecommunication system, where the telecommunication system employs Orthogonal Frequency Division Multiple Access. The method comprises receiving a transmission signal, comprising reference symbols and synchronisation symbols, from the network node of the at least one cell; determining at least one pre-coding vector, of which one pre-coding vector being associated with transmission by an at least one transmit antenna of the network node of the at least one cell, for the transmission signal; and estimating, for each of the at least one pre-coding vector, a channel estimate for all sub-carriers of the received transmission signal from the received reference symbols and a reference symbol channel model defined for reference symbols of the transmission signal, and from the synchronisation symbols, the at least one pre-coding vector and a synchronisation symbol channel model defined for synchronisation symbols of the transmission signal.

The pre-coding vector may be given by the system specification, communicated by the network node, estimated by the terminal, or determined in any other way.

The method may further comprise decoding the system information using the at least one channel estimate.

The method may further comprise determining likelihood of the at least one decoded system information; and selecting the decoded system information being most likely. The determining of likelihood may comprise examination of a check sum. The check sum may be comprised in the synchronisation symbols, or in the system information.

The at least one pre-coding vector may comprise all possible pre-coding vectors usable by the network node.

The at least one pre-coding vector may comprise a known set of one or more pre-coding vectors actually used by the network node.

The method may further comprise performing handover based on the system information.

The estimation of the at least one channel estimate may comprise minimising mean square error for the channel estimate, when $\hat{H}$ is biased, $\hat{H}=KY$, where Y are received symbols and $$K = [I \quad A^H] \cdot \left( \begin{bmatrix} I \\ A \end{bmatrix} [I \quad A^H] + \sum_E \right)^{-1}$$

where I is an identity matrix, A is the pre-coding vector, and $\Sigma_E$ is the noise covariance matrix.

The estimation of the at least one channel estimate may comprise minimising mean square error for the channel estimate, when $\hat{H}$ is unbiased, $\hat{H}=KY$, where Y are received symbols $$K = [I - \overline{K}A \quad \overline{K}]$$

and

-continued $$\overline{K} = [I\ 0] \sum_E \begin{bmatrix} A^H \\ I \end{bmatrix} \cdot \left( [-A\ I] \sum_E \begin{bmatrix} -A^H \\ I \end{bmatrix} \right)^{-1}$$

where I is an identity matrix, A is the pre-coding vector, and $\Sigma_E$ is the noise covariance matrix.

According to a second aspect, there is provided a decoder for a terminal of a cellular telecommunication system in which system information is provided from at least one cell operated by a network node of the telecommunication system, where the telecommunication system employs Orthogonal Frequency Division Multiple Access. The decoder comprises a receiver arranged to receive a transmission signal comprising reference symbols and synchronisation symbols from a network node of the at least one cell; a pre-coding vector determinator arranged to determine at least one pre-coding vector, of which one pre-coding vector being associated with transmission by at least one transmit antenna of the network node of the at least one cell, for the transmission signal; and a channel estimator arranged to estimate, for each of the at least one pre-coding vector, a channel estimate for all sub-carriers of the received transmission signal from the received reference symbols and a reference symbol channel model defined for reference symbols of the transmission signal, and from the synchronisation symbols, the at least one pre-coding vector and a synchronisation symbol channel model defined for synchronisation symbols of the transmission signal, such that the decoder is enabled to decode the system information using the at least one channel estimate.

The decoder may further be arranged to determine the likelihood of the at least one decoded system information; and select the decoded system information being most likely.

The determination of likelihood may involve a check of a check sum. The check sum may be comprised in the synchronisation symbols or in the system information.

The at least one pre-coding vector may comprise all possible pre-coding vectors usable by the network node.

The at least one pre-coding vector may comprise a known set of one or more pre-coding vectors actually used by the network node.

The at least one channel estimate may be $\hat{H}=KY$, when $\hat{H}$ is biased, where Y are received symbols and $$K = [I\ A^H] \cdot \left( \begin{bmatrix} I \\ A \end{bmatrix} [I\ A^H] + \sum_E \right)^{-1}$$

where I is an identity matrix, A is a pre-coding vector, and $\Sigma_E$ is the noise covariance matrix.

The at least one channel estimate may be $\hat{H}=KY$, when $\hat{H}$ is unbiased, where Y are received symbols, $$K = [I - \overline{K}A\ \overline{K}]$$

and $$\overline{K} = [I\ 0] \sum_E \begin{bmatrix} A^H \\ I \end{bmatrix} \cdot \left( [-A\ I] \sum_E \begin{bmatrix} -A^H \\ I \end{bmatrix} \right)^{-1}$$

where I is an identity matrix, A is a pre-coding vector, and $\Sigma_E$ is the noise covariance matrix.

According to a third aspect, there is provided a terminal for a cellular telecommunication system in which system information is provided from at least one cell operated by a network node of the telecommunication system, where the telecommunication system employs Orthogonal Frequency Division Multiple Access. The terminal comprises a decoder according to the second aspect. The terminal may be arranged to perform handover based on the received system information.

According to a fourth aspect, there is provided a computer program comprising computer executable instructions causing a processor, when executed thereon, to perform the method according to the first aspect.

An advantage of an embodiment of the invention is improved channel estimation.

An advantage of an embodiment of the invention is improved reception of system information.

An advantage of an embodiment of the invention is improved decoding thanks to the improved channel estimate.

An advantage of an embodiment of the invention is improved handover.

Further advantages will be recognised when reading the detailed description, taking into consideration what is illustrated in the accompanying drawings.

DETAILED DESCRIPTION

Figure 1:
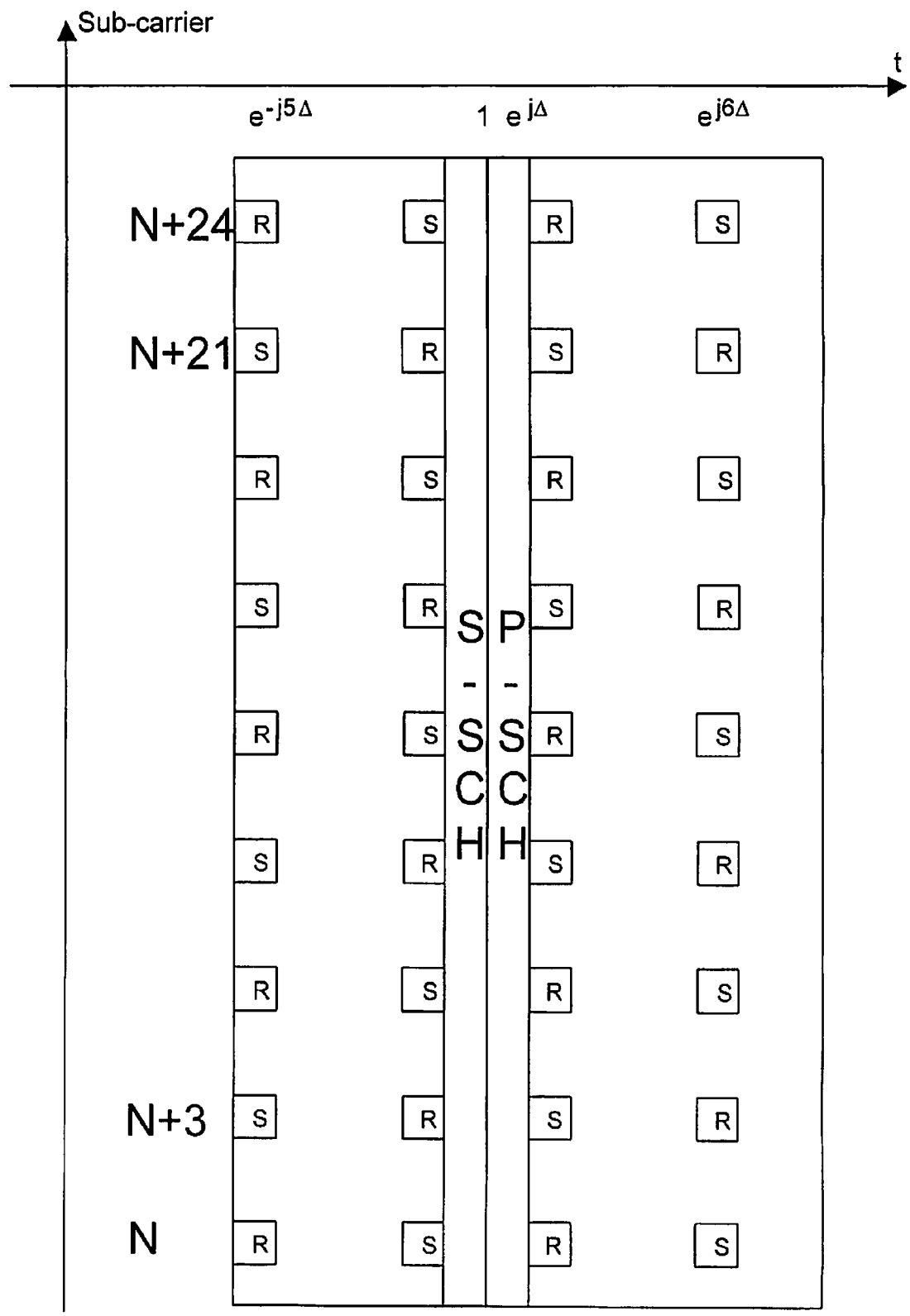
FIG. 1 schematically illustrates an example of transmitted signals used for improved channel estimation.

FIG. 1 schematically illustrates an example of transmitted signals used for improved channel estimation. In detail, FIG. 1 shows a time-frequency pattern for a reference symbol from a first R and potential second antenna S in LTE. In LTE, up to four transmit antennas can be used by the network node. Also, synchronization signals P-SyS and S-SyS, transmitted via primary synchronization channel (P-SCH) and secondary synchronization channel (S-SCH), respectively, are further transmitted on middle 62 sub-carriers every 5 ms in sub-frames 0 and 5 are shown in FIG. 1. Once a cell identity is known to the mobile terminal, the P-SyS and S-SyS symbols are also known, and can hence be used as additional reference symbols. A pre-coding scheme for the synchronization signals, i.e. how P-SyS and S-SyS are transmitted from the transmitter antennas of a network node, is employed, at least when multiple transmit (TX) antennas are used by the network node, to avoid degradation of the aggregate transmit signal.

In the given example, an $i^{th}$ received reference symbol $y_i$ received from the first antenna, which transmitted symbol $r_i$, will be given by $y_i = h_i^1 r_i + e_i$, where $h_i^1$ is the channel from the first antenna to the receiver, and $e_i$ is introduced noise. Similarly, an $i^{th}$ received reference symbol $y_i$ received from the second antenna, which transmitted symbol $s_i$, will be given by $y_i = h_i^2 s_i + e_i$, where $h_i^2$ is the channel from the second antenna to the receiver, and $e_i$ is introduced noise. For the synchronisation symbols, an $i^{th}$ received synchronisation symbol $y_i$ received from the antennas, which transmitted symbol $p_i$, will be given by $y_i = h_i^3 p_i + e_i$, where $h_i^3$ is the channel from the antennas to the receiver, and $e_i$ is introduced noise. Since pre-coding is used for the synchronisation signals transmitted by the two antennas, which each have channels according to what has been demonstrated for the reference symbols above, $y_i = h_i^3 p_i + e_i = (a_1 h_i^1 + a_2 h_i^2) p_i + e_i$, where $a_1$ and $a_2$ are the pre-coding for the two transmit antennas.

Pre-coding here represented by the parameters $a_i$ is assumed to be known by the terminal, either by blind detection by the terminal itself, for instance determined by testing all possible configurations and picking the one that gives a working result, e.g. by checking a check sum, or could be signalled from the network node, e.g. in synchronisation signals, or known in advance from the standard of the system.

For the understanding of the principles, according to a first channel estimation scheme, the given measurements $$Y = BH + E$$

where $$H = \begin{bmatrix} h_0 \\ \vdots \\ h_N \end{bmatrix}$$

are the N true channel values, $$B = \begin{bmatrix} I \\ A \end{bmatrix}$$

I is an identity matrix, and A is the pre-coding vector from above. E is a vector of channel noise with covariance matrix $\Sigma_E$.

The channel estimate $\hat{H}$ is calculated using the linear estimator $$\hat{H} = KY.$$

K can be selected to minimize the mean square error $$MSE = E\{(\hat{H}-H)^H(\hat{H}-H)\}$$

which has the solution $$K_{MMSE} = B^H(BB^H + \Sigma_E)^{-1} = [I \ A^H] \cdot \left( \begin{bmatrix} I \\ A \end{bmatrix} [I \ A^H] + \Sigma_E \right)^{-1}.$$

The resulting covariance of the error $\tilde{H} = \hat{H} - H$ then becomes $$\Sigma_{\tilde{H}} = E\{H^H H\} - B(BB^H + \Sigma_E)^{-1}B =$$

$$E\{H^H H\} - [I \ A^H] \cdot \left( \begin{bmatrix} I \\ A \end{bmatrix} [I \ A^H] + \Sigma_E \right)^{-1} \begin{bmatrix} I \\ A \end{bmatrix}$$

Note that the estimate $\hat{H}$ is, in general biased, and the superscript "H" denotes a Hermitian transpose as denoted when presenting matrix and vector operations.

According to a second channel estimation scheme, under the same assumptions as in the first scheme, an unbiased linear estimator is proposed as $$\hat{H} = KY,$$

where K is now calculated by minimizing mean square error under the condition that $\hat{H}$ is unbiased, i.e.

$$E\{\hat{H}\} = E\{KY\} = E\{KBH + KE\} = H$$

which implies $KB = I$.

The corresponding solution is $$K_{UB} = [I - \bar{K}A \ \bar{K}]$$

where $$\bar{K} = [I \ 0] \Sigma_E \begin{bmatrix} A^H \\ I \end{bmatrix} \cdot \left( [-A \ I] \Sigma_E \begin{bmatrix} -A^H \\ I \end{bmatrix} \right)^{-1}$$

The resulting covariance of the error $\tilde{H} = \hat{H} - H$ then becomes $$\sum_{\tilde{H}} = E\left\{ K_{UB} \sum_E K_{UB}^H \right\}$$

To illustrate the advantages of the invention, the performance of an OFDM system with and without the proposed method is calculated. The effect of demodulating OFDM symbols with non-perfect channel knowledge can be expressed as an effective signal-to-noise ratio $SNR_{chest}$ as a function of channel signal-to-noise ratio $$SNR = \frac{S}{\sigma^2}$$

where S is the average received symbol energy and $\sigma^2$ is the symbol noise energy.

For a 1 TX antenna system $$SNR_{chest} = SNR \frac{1}{1 + \frac{1}{N}\left(1 + \frac{1}{SNR}\right)}$$

where N is the channel estimation processing gain, i.e. so that $$\sigma_{\tilde{H}}^2 = \frac{\sigma^2}{N}$$

Typically, with the proposed method, N is increased substantially and thereby reducing the channel estimation loss, especially at low SNR.

For a 2 TX antenna system and SFBC (The Alamouti scheme) modulated data symbols, the corresponding equivalent channel estimation SNR can be shown to be $$SNR_{chest} = SNR \frac{1}{1 + \left(\frac{1}{2N} + \frac{1}{2M}\right)\left(1 + \frac{1}{SNR}\right)}$$

where N and M are the channel estimation gains for TX antenna 1 and 2 respectively. With the proposed method, typically one of N or M is increased substantially.

For 3GPP LTE PBCH decoding in 1 TX case, the improved performance is illustrated by calculating the LTE PBCH decoding error probability with and without using the P-SyS and S-SyS symbols as reference symbols. In this example we assume only one TX antenna. We also assume that using only reference symbols, 4 coherent references symbols are available without using P-SyS and S-SyS; in other words N=4. When using P-SyS and S-SyS as pilots, N is increased to N=16. The impact on PBCH decoding, where also two RX antennas have been assumed is a gain is on the order of 2 dB.

For 3GPP LTE PBCH decoding in 2 TX case, using the same assumptions as in the previous example, except that two TX antennas are used with SFBC modulation, we obtain a gain is on the order of 0.5–1 dB, which is lower than in the 1 TX case. This is due to the fact that twice as many pilots are being transmitted in the 2 TX antenna case for the same amount of data. Here N=4 and M=16 have been assumed.

Figure 2:
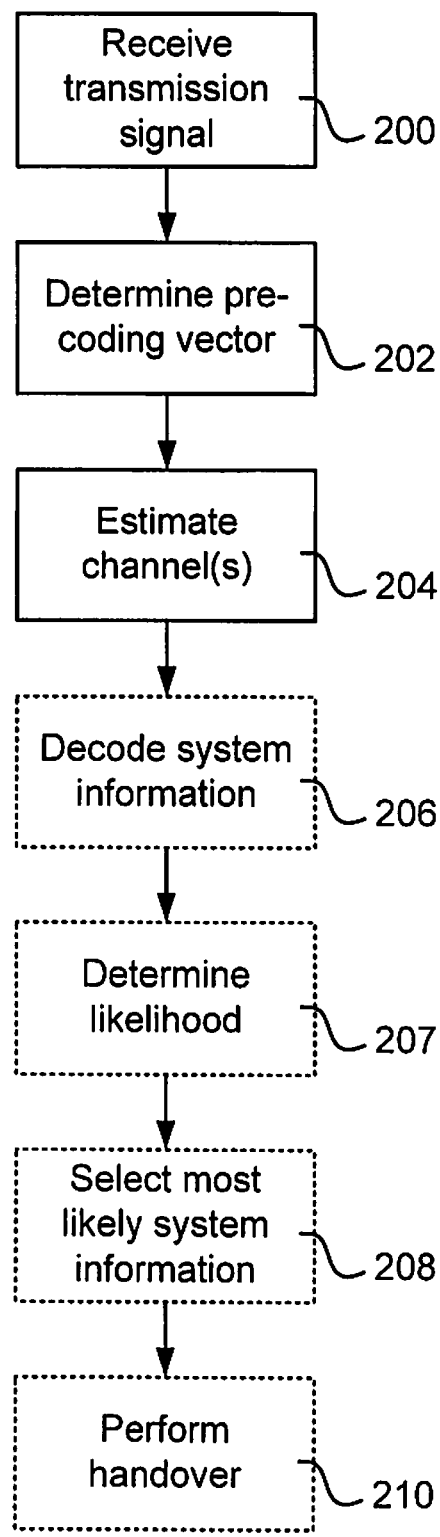
FIG. 2 is a flow chart illustrating a method according to an embodiment of the present invention.

FIG. 2 is a flow chart illustrating a method according to an embodiment of the present invention. In a receiving step 200, a transmission signal, e.g. a broadcast signal on a broadcast channel, comprising reference symbols and synchronisation symbols e.g. as the example given in FIG. 1, as well as desired system information, e.g. for LTE the PBCH, is received from a network node of a cell. The cell can be the serving cell, any neighbouring cell, or any other cell from which system information is desired. To be able to perform the desired operations, corresponding pre-coding vector(s) has (have) to be known, each pre-coding vector being associated with transmission by one transmit antenna of the network node of the cell. Therefore, in a pre-coding determining step 202, the pre-coding vector is determined for the transmission signal. This can be done either by blind detection by the terminal itself, for instance determined by testing all possible configurations and picking the one that gives a working result, e.g. by checking a check sum, or could be signalled from the network node, e.g. in synchronisation signals, or be known in advance, e.g. from the standard of the system. When the pre-coding vector is known and symbols of the transmission signal are received, a channel estimate for all sub-carriers of the received transmission signal from the received reference symbols and a reference symbol channel model defined for reference symbols of the transmission signal, and the synchronisation symbols, the at least one pre-coding vector and a synchronisation symbol channel model defined for synchronisation symbols of the transmission signal is estimated for each pre-coding vector in a channel estimating step 204. When the channel estimate(s) are present, the desired system information can be decoded in a system information decoding step 206. For the embodiment where a number of possible pre-coding vectors have been used, among which only a fewer or one are the correct ones, a number of decoded system information sets are present, of which only one is correct. In that case, it is determined in a likelihood determination step 207 the likelihood of the different information sets. Then, in a system information set selection step 208, the most likely information set is picked, and the others are discarded. The determination of likelihood can be performed by checking check sums of the information sets. When the pre-coding vector is known in advance, this is not necessary, and the correct information set can be decoded directly. Optionally, the acquired system information can be used for performing a handover in a handover performing step 210.

Figure 3:
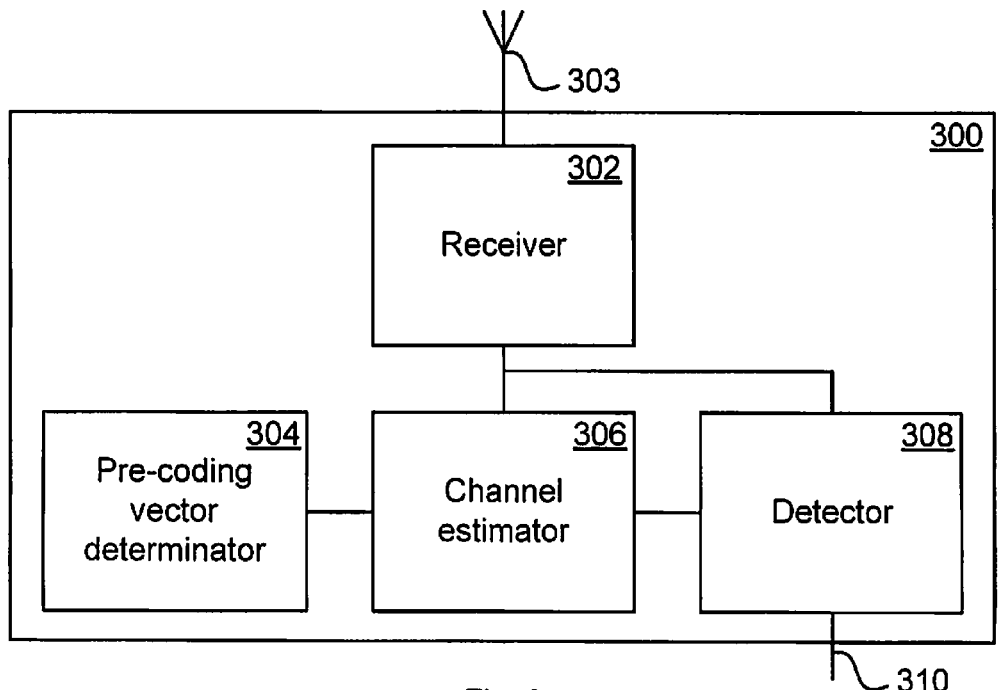
FIG. 3 is a block diagram schematically illustrating a decoder according to an embodiment of the present invention.

FIG. 3 is a block diagram schematically illustrating a decoder 300 according to an embodiment of the present invention. The decoder 300 comprises a receiver 302 that is arranged to receive a transmission signal, e.g. a broadcast signal on a broadcast channel, comprising reference symbols, synchronisation symbols, and system information from a network node of a cell. The cell can be the serving cell, any neighbouring cell, or any other cell from which system information is desired. The receiver 302 receives the transmission signal via one or more receiver antennas 303. A pre-coding vector determinator 304 is arranged to determine at least one pre-coding vector, each pre-coding vector being associated with transmission by one transmit antenna of the network node of the at least one cell, for the transmission signal. The pre-coding vector determinator 304 can gain knowledge of the actually used pre-coding vector as described above, or provide a set of possible pre-coding vectors such that the feasible result is selected in the end, as also described above. A channel estimator 306 uses the received reference symbols and a reference symbol channel model defined for reference symbols of the transmission signal, and the synchronisation symbols, the at least one pre-coding vector and a synchronisation symbol channel model defined for synchronisation symbols of the transmission signal to perform channel estimation. This can be performed according to the principles demonstrated above. The received symbols and the channel estimate is provided to a detector 308 such that the decoder 300 is enabled to decode the system information using the at least one channel estimate and provide the decoded system information on its output 310.

Figure 4:
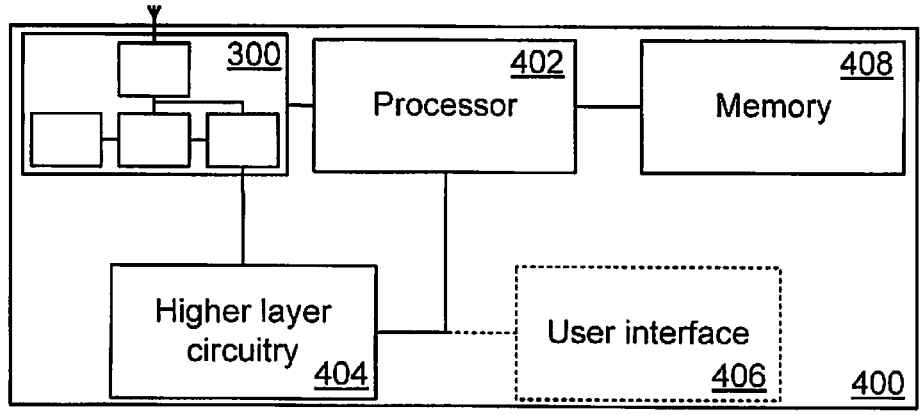
FIG. 4 is a block diagram schematically illustrating a terminal according to an embodiment of the invention.

FIG. 4 is a block diagram schematically illustrating a terminal 400 according to an embodiment of the invention. The terminal 400 comprises a decoder 300 as the one demonstrated with reference to FIG. 3. The terminal preferably also comprises a processor 402 controlling operation of the decoded 300, as well as higher layer circuitry 404 and an optional user interface 406. Preferably, the terminal also comprises a memory 408 connected to the processor, e.g. for storing possible pre-coding vectors to be provided to the decoder 300.

Figure 5:
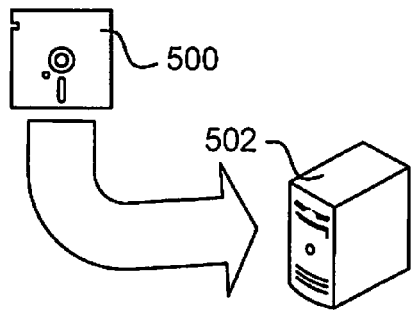
FIG. 5 schematically illustrates a computer readable media comprising a computer program for implementing a method according to any embodiment of the present invention.

The method according to the present invention is suitable for implementation with aid of processing means, such as computers and/or processors, as the operation of OFDM systems highly rely on computerized signal processing in general. Therefore, there is provided computer programs, comprising instructions arranged to cause the processing means, processor, or computer to perform the steps of any of the methods according to any of the embodiments described with reference to FIG. 2, in a terminal. The computer programs preferably comprises program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIG. 2. The computer 502 and computer program product 500 can be arranged to execute the program code sequentially where actions of the any of the methods are performed stepwise, but mostly be arranged to execute the program code on a real-time basis where actions of any of the methods are performed upon need and availability of data. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

The invention claimed is:

1. A method for a terminal of a cellular telecommunication system, the telecommunication system enabling determination of broadcasted system information by the terminal from broadcasted system information from at least one cell operated by a network node of the telecommunication system, where the telecommunication system employs Orthogonal Frequency Division Multiple Access, the method comprising:
   receiving a transmission signal, comprising reference symbols and synchronisation symbols, from the network node of the at least one cell;
   determining at least one pre-coding vector, of which one pre-coding vector being associated with transmission by an at least one transmit antenna of the network node of the at least one cell, for the transmission signal; and
   estimating, for each of the at least one pre-coding vector, a channel estimate for all sub-carriers of the received transmission signal from the received reference symbols and a reference symbol channel model defined by reference symbols of the transmission signal, and from the synchronisation symbols, the at least one pre-coding vector and a synchronisation symbol channel model defined by synchronisation symbols of the transmission signal, wherein estimating the channel estimate comprises minimising mean square error for the channel estimate, when $\hat{H}$ is biased, $\hat{H}=KY$, where Y are received symbols and $$K = [I\ A^H] \cdot \left( \begin{bmatrix} I \\ A \end{bmatrix} [I\ A^H] + \sum_E \right)^{-1}$$

where I is an identity matrix, A is the pre-coding vector, and $\Sigma_E$ is the noise covariance matrix.

2. The method according to claim 1, further comprising decoding the broadcasted system information using the channel estimate.

3. The method according to claim 2, further comprising
   determining likelihood of the at least one decoded broadcasted system information; and
   selecting the decoded broadcasted system information having the highest likelihood.

4. The method according to claim 3, wherein the determining of likelihood comprises examination of a check sum.

5. The method according to claim 4, wherein the check sum is comprised in the synchronisation symbols.

6. The method according to claim 4, wherein the check sum is comprised in the broadcasted system information.

7. The method according to claim 1, wherein the at least one pre-coding vector comprises all pre-coding vectors usable by the network node.

8. The method according to claim 1, wherein the at least one pre-coding vector comprises a set of one or more pre-coding vectors actually used by the network node.

9. A decoder for a terminal of a cellular telecommunication system in which broadcasted system information is provided from at least one cell operated by a network node of the telecommunication system, where the telecommunication system employs Orthogonal Frequency Division Multiple Access, the decoder comprising:
   a receiver arranged to receive a transmission signal comprising reference symbols and synchronisation symbols from the network node of the at least one cell;
   a pre-coding vector determinator arranged to determine at least one pre-coding vector, of which one pre-coding vector being associated with transmission by at least one transmit antenna of the network node of the at least one cell, for the transmission signal; and
   a channel estimator arranged to estimate, for each of the at least one pre-coding vector, a channel estimate for all sub-carriers of the received transmission signal from the received reference symbols and a reference symbol channel model defined by reference symbols of the transmission signal, and from the synchronisation symbols, the at least one pre-coding vector and a synchronisation symbol channel model defined by synchronisation symbols of the transmission signal, wherein the channel estimate is $\hat{H}=KY$, when $\hat{H}$ is biased, where Y are received symbols and $$K = [I\ A^H] \cdot \left( \begin{bmatrix} I \\ A \end{bmatrix} [I\ A^H] + \sum_E \right)^{-1}$$

where I is an identity matrix, A is the pre-coding vector, and $\Sigma_E$ is the noise covariance matrix.

10. The decoder according to claim 9, further arranged to
    decode the broadcasted system information using the channel estimate;
    determine the likelihood of the at least one decoded broadcasted system information; and
    select the decoded broadcasted system information being most likely.

11. The decoder according to claim 10, wherein the determination of likelihood involves a check of a check sum.

12. The decoder according to claim 11, wherein the check sum is comprised in the synchronisation symbols.

13. The decoder according to claim 11, wherein the check sum is comprised in the broadcasted system information.

14. The decoder according to claim 9, wherein the at least one pre-coding vector comprises all pre-coding vectors usable by the network node.

15. The decoder according to claim 9, wherein the at least one pre-coding vector comprises a set of one or more pre-coding vectors actually used by the network node.

16. A user equipment (UE) of a cellular telecommunication system, the telecommunication system enabling determination of broadcasted system information by the UE from broadcasted information from at least one cell operated by a network node of the telecommunication system, where the telecommunication system employs Orthogonal Frequency Division Multiple Access, the UE comprising:
   at least one processor; and
   a non-transitory computer-readable storage medium, coupled to the at least one processor, including computer-readable instructions, when executed by the at least one processor, are configured to:
   receive a transmission signal, comprising reference symbols and synchronization symbols, from the network node of the at least one cell;
   determine at least one pre-coding vector, of which one pre-coding vector being associated with transmission by an at least one transmit antenna of the network node of the at least one cell, for the transmission signal; and
   estimate, for each of the at least one pre-coding vector, a channel estimate for all sub-carriers of the received transmission signal from the received reference symbols and a reference symbol channel model defined by reference symbols of the transmission signal, and from the synchronization symbols, the at least one pre-coding vector and a synchronization symbol channel model defined by synchronization symbols of the transmission signal, wherein the channel estimate is $\hat{H}=KY$, when $\hat{H}$ is biased, where Y are received symbols and $$K = [I\ A^H] \cdot \left( \begin{bmatrix} I \\ A \end{bmatrix} [I\ A^H] + \sum_E \right)^{-1}$$

where I is an identity matrix, A is the pre-coding vector, and $\Sigma_E$ is the noise covariance matrix.

* * * * *